United States Patent [19]

Musyck et al.

[11] Patent Number: 4,816,655
[45] Date of Patent: Mar. 28, 1989

[54] METHOD AND APPARATUS FOR CHECKING THE AUTHENTICITY OF INDIVIDUAL-LINKED DOCUMENTS AND THE IDENTITY OF THE HOLDERS THEREOF

[75] Inventors: Emile P. Musyck, Geel; Luc A. Binard, Mol; Bernard G. Coupe, Tournai, all of Belgium

[73] Assignee: Centre d'Etude de l'Energie Nucleaire, "C.E.N.", Brusseles, Belgium

[21] Appl. No.: 939,651

[22] Filed: Dec. 9, 1986

[30] Foreign Application Priority Data

Dec. 11, 1985 [LU] Luxembourg ............... 86203

[51] Int. Cl.$^4$ ............................................. G06K 5/00
[52] U.S. Cl. ........................................ 235/380; 380/23; 380/30; 902/2; 340/825.34
[58] Field of Search ............... 235/379, 380, 381, 382; 380/23, 24, 25, 30; 902/2, 4; 340/825.34, 825.31

[56] References Cited

U.S. PATENT DOCUMENTS

| | | | |
|---|---|---|---|
| 4,186,871 | 2/1980 | Anderson | 235/380 |
| 4,304,961 | 12/1981 | Campbell | 235/380 |
| 4,328,414 | 5/1982 | Atalla | 235/380 |
| 4,405,829 | 9/1983 | Rivest et al. | 380/30 |
| 4,453,074 | 6/1984 | Weinstein | 235/380 |
| 4,536,647 | 8/1985 | Atalla et al. | 235/379 |
| 4,658,094 | 4/1987 | Clark | 380/30 X |
| 4,723,284 | 2/1988 | Munck et al. | 380/30 X |

Primary Examiner—A. D. Pellinen
Assistant Examiner—H. L. Williams
Attorney, Agent, or Firm—Sughrue, Mion, Zinn, Macpeak, and Seas

[57] ABSTRACT

There is described a method and an apparatus which comprises a reader for reading document characteristics, circuitry permitting the formation of a message confirming the holder identity, a computer connected to said reader and message means, said computer is so designed as to be able to perform from those data obtained by the reader and said means, and possibly from other remotely-conveyed data, a mathematical processing including one or a plurality of encipherings according to a public-key cryptography method and making use therefor but of public keys, means being provided to check with said computer, by a third party, and/or remotely with another computer, the expected match between said collected data, a non-secret number independent from the document, and identification data present unscrambled on the document, which match is disclosed by the mathematical processing.

19 Claims, 6 Drawing Sheets

METHOD AND APPARATUS FOR CHECKING THE AUTHENTICITY OF INDIVIDUAL-LINKED DOCUMENTS AND THE IDENTITY OF THE HOLDERS THEREOF

This invention relates to a method for checking the authenticity of an individual-linked document, such as credit-card, bank-card, check, access badge, etc..., as well as the identity of the holder or bearer of such document by data processing, which data comprise a secret message confirming the identity of the document holder to control the match between said document and message.

The use of secret codes has spread widely in those plants and equipments by which access or use should be limited and in circumstances in which the user has to be positively identified. The automatic cash-dispensing machines and the automatic paying equipments comprise an illustration thereof.

The apparatus presently in operation check that the bank-card identification number as read by the reader and the secret code typed on the keyboard by the card holder suitably match. They perform such checking by mathematical processing with the use of a secret key. This operating method has various drawbacks:

When the apparatus is designed for "off-line" operation, the secret key has necessarily to be included in every equipment and in such a case, when law-breakers get their hands on a single equipment, this is sufficient to endanger the whole network.

When the secret key is stored in a central computer, "on-line" operation is required and as in such a case, it is unconceivable to convey the secret code without scrambling in the communication network, the apparatus should necessarily also have secret keys.

All said apparatus require a heavy physical protection due to the secret keys being included therein and they are thus relatively costly.

The secret code is assigned to the user and is thus difficult to memorize.

As the secret code is limited to four digits, the cash-dispensing apparatus are so designed as to disable every card wherewith three successive unsucessful attempts would have been made.

A checking or identifying operation usually occurs when an user wants to benefit from an organization, make use of an equipment or gain access to a data-processing network. As a rule such an operation is comprised of a comparison between on the one hand the secret data kept by the concerned individual, such as the shape of a lock key, a safe combination, a password for a computer, etc..., and on the other hand a reference such as an arrangement or a peculiar shape of some parts in the lock, in the safe opening mechanism, or such as a specific number buried in the computer memory. In the known methods and apparatus, such reference or the equivalent thereof should necessarily be kept secret, for instance when the reference is not directly present but is being computed at the checking time, it is then the computing algorithm or the key used therein which should be kept secret.

One essential object of this invention is to provide a method which obviates the above drawbacks, that is which allows checking the authenticity of an individual-linked document and the identity of the document holder without requiring to store secret elements or data in that apparatus which performs such checking on site, on the document to be checked or on any other document being used by this checking.

The method according to the invention comprises using a document provided with a specific characteristic which does not necessarily have to be kept secret and which defines a hidden relation notably with said secret message, feeding the data pertaining to the message and document characteristic to a computer, performing with said computer, from said data and possibly also from some other non-secret, remotely-conveyed data, a mathematical processing the algorithm of which does not necessarily have to be kept secret, which mathematical processing includes one or a plurality of encipherings according to a public-key cryptography method and using thereby but public keys, and checking with said computer, by a third party and/or remotely with another computer, the match which has to exist between said data, at least one non-secret reference number, independent from the document, and unscrambled identification data on the document, which match is revealed by said mathematical processing.

Advantageously, use is made for the public-key cryptography method, of the R.S.A. (Rivest, Shamir and Adleman) system with the following algorithm: $M^e$ modulo $n = C$, wherein M is the integer which is the object of the enciphering, for example that number computed from said message, e and n are numbers the public key is comprised of, and C is the whole remainder from the division of $M^e$ by n.

The invention further pertains to an apparatus for checking the authenticity of individual-linked documents, notably credit-card, bank-card, check, access badge, etc..., as well as the identity of the document characteristics, means for letting said holder form a secret message confirming his identity, and a computer provided with computing and memory functions, which is connected to said reader and message-forming means.

According to one aspect of this apparatus, the computer is so designed as to be able to perform from those data obtained by the reader and said means, and possibly from other remotely-conveyed data, a mathematical processing including one or a plurality of encipherings according only to a public-key cryptography method, means being provided to check with said computer, by a third party and/or remotely with another computer, the match which has to exist between said collected data, a non-secret reference number independent from the document, and identification data present unscrambled on said document, which match is revealed by the mathematical processing.

Other details and features of the invention will stand out from the following description, given by way of non limitative example and with reference to the accompanying drawings, in which.

Figure 4:
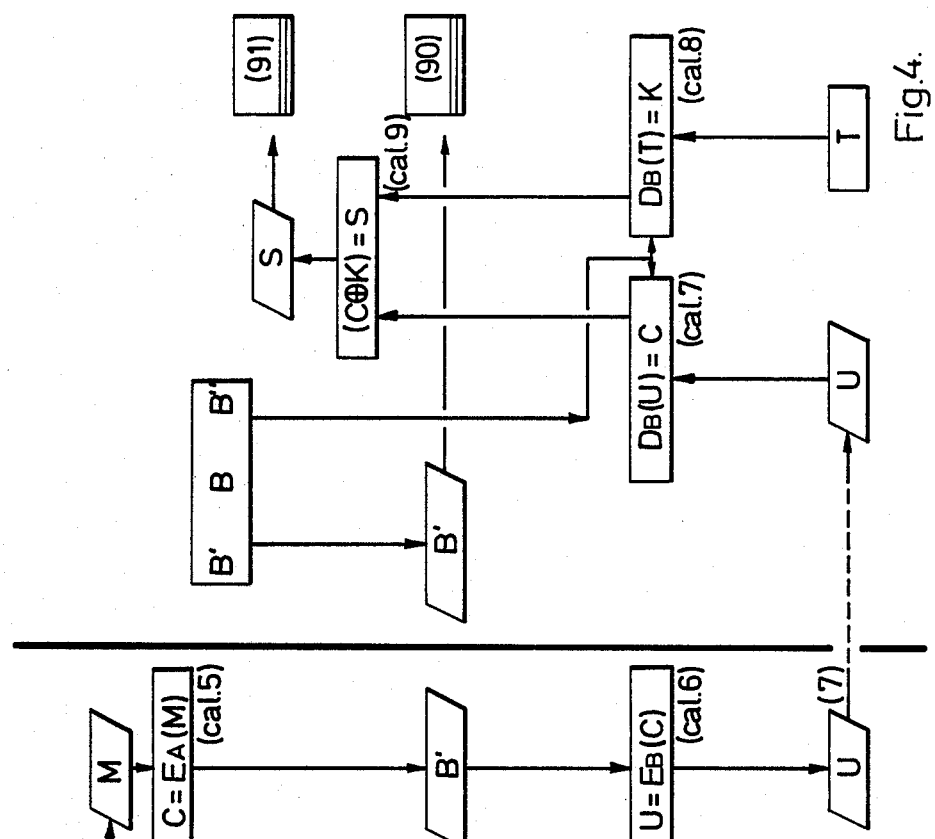
FIG. 4 is a diagrammatic showing of the embodiment from FIG. 3, as regards determining the specific characteristic of the document to be checked.
Figure 3:
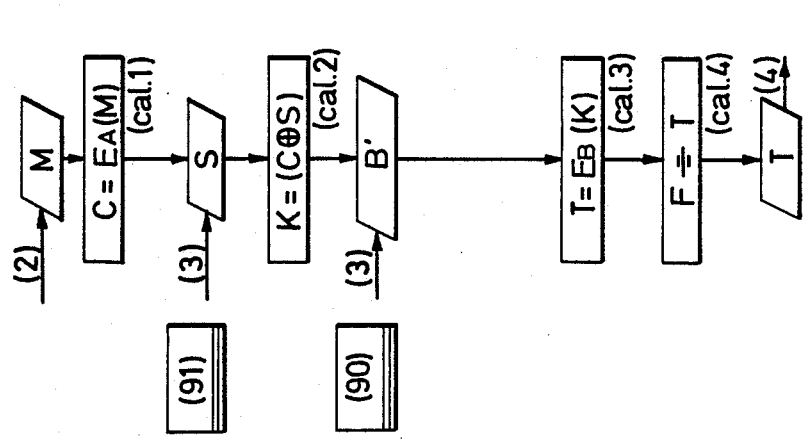
FIG. 3 is a diagrammatic showing of the various steps in a particular embodiment of the method according to the invention, as regards the document checking.
Figure 7:
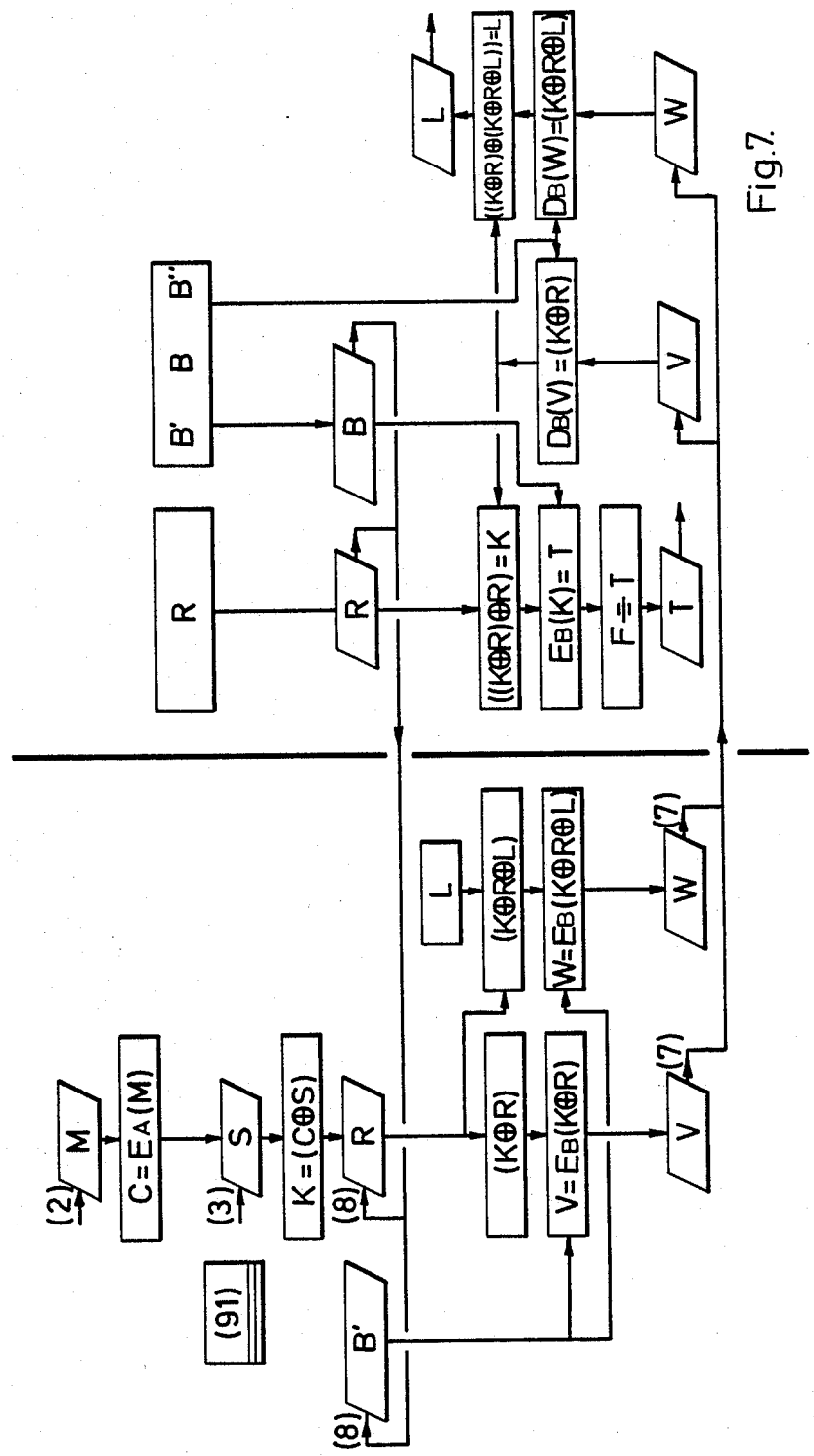
FIG. 7 is a diagrammatic showing of a second particular embodiment of the method according to the invention.

In the various figures, the same reference numerals show identical or similar elements. In FIGS. 3, 4 and 7, the identical, similar or reciprocal functions lie on one and the same line.

This invention relates to a method allowing to check the authenticity of a document linked to an individual, and the bearer identity, without requiring storing secret elements or data in that apparatus which performs said checking, or on the document to be checked or on any other document being used during the checking.

Said document is for example a credit-card, a bankcard, a check or an access badge.

The method calls on public-key cryptography which makes use of paired keys, the one of which should be kept secret, but the other one may be disclosed. The function of this two-key set may be illustrated as follows. Let $E_A(M)=C$ be an enciphering performed on a number M representing a message, by means of the public key from key set A. By knowing C and the cryptography algorithm, it is only possible to recover M by performing the reciprocal enciphering on number C by means of the paired secret key:

$$D_A(C)=D_A(E_A(M))=M \qquad \text{(rel. 1)}$$

For this purpose, the knowledge of the secret key is unavoidable. It is only the holder of said key who can recover M.

With the other cryptography systems, the holder of a key can recover by computing the paired key and thereby number M.

The interest of public-key cryptography lies in the substantial impossibility to uncover a secret key from the paired public key, even with a very powerful dedicated computer when the secret key is a large-enough number.

The public-key cryptography method being recommended but not exclusively, is the RSA system (see Rivest, Shamir and Adleman "A method for obtaining digital signatures and public-key cryptosystems" MIT/LCS/TM-82 April 1977).

In the RSA system, the paired keys are comprised of two numbers: a common number and an own number. The public key is comprised of the numbers n and e, and the secret key of the numbers n and d. There is obtained:

$E(M)=M^e$ modulo $n=C$ (enciphering with public key)     (rel. 2)

$D(C)=C^d$ modulo $n=M$ (enciphering with secret key)     (rel. 3)

Number M must be an integer. Modulo n of e power from M or of d power from C is the whole remainder from dividing $M^e$ or $C^d$ by n. The number e which is not secret may be a small number, which makes computing easier. Advantageously, use is made of the number 3, as power index of M. The number n, which is not secret either, is the product of two large prime numbers p and q.

According to the invention, n is advantageously comprised of two very large prime factors, which are each preferably higher than the 200th power of 2.

It is of importance to note that p and q should remain secret, as they enable to find the secret element from the secret key, with the formula: e.d modulo $[(p-1).(q-1)]=1$.

Said secret factors may be selected randomly from a multitude of prime numbers, so as to prevent substantially such factors being discovered.

The method makes original use of public cryptography by avoiding the use of secret keys during checking the authenticity of the document and the holder identity.

Thus according to the invention, the mathematical processing is performed from two data at least:

A secret message, selected and kept by the rightful owner of the document, confirming the holder identity, comprising letters, digits and/or signs;

A characteristic peculiar to the document, defining a number S which should not necessarily be kept secret in the coded form thereof, but which represents a hidden relation with said secret message. This hidden relation is disclosed by the mathematical processing, the result thereof should have the expected match with a reference number F, not secret, independent from the document and with data peculiar to the document.

Such data are for example the year of issue and the recording number of the document or the account number of the holder. The holder of a valid card can not consequently use a stolen card by substituting for the number S from this card, the number S from his own card with the purpose of making use of his own secret message with the stolen card. By acting in this way, he would disclose his own identity. The secret message transposed in the form of a number M undergoes during the mathematical processing thereof, at least one enciphering by means of a public key. In this way, the knowledge of the algorithm being used and of the number S peculiar to a document does not enable recovering the corresponding secret message, unless with the use of the paired secret key which is not included in the apparatus working with the checking method, and which is not used thereby. In practice the fraudulent use of a stolen card is made impossible thereby, as it is not possible to know M.

The number S deduced from the characteristic peculiar to the document to be checked also undergoes during the mathematical processing, at least one enciphering by means of a public key. Consequently, the knowledge of the algorithm being used does not enable to find that number S which corresponds to a given message. The manufacturing of false cards is made impossible thereby.

The encipherings of the number M and the number S may be performed simultaneously; in such a case, it is a function of both numbers which is being enciphered.

This invention also relates to an apparatus for checking the document authenticity and the holder identity, more particularly an apparatus working with the method as defined hereinabove.

Figure 1:
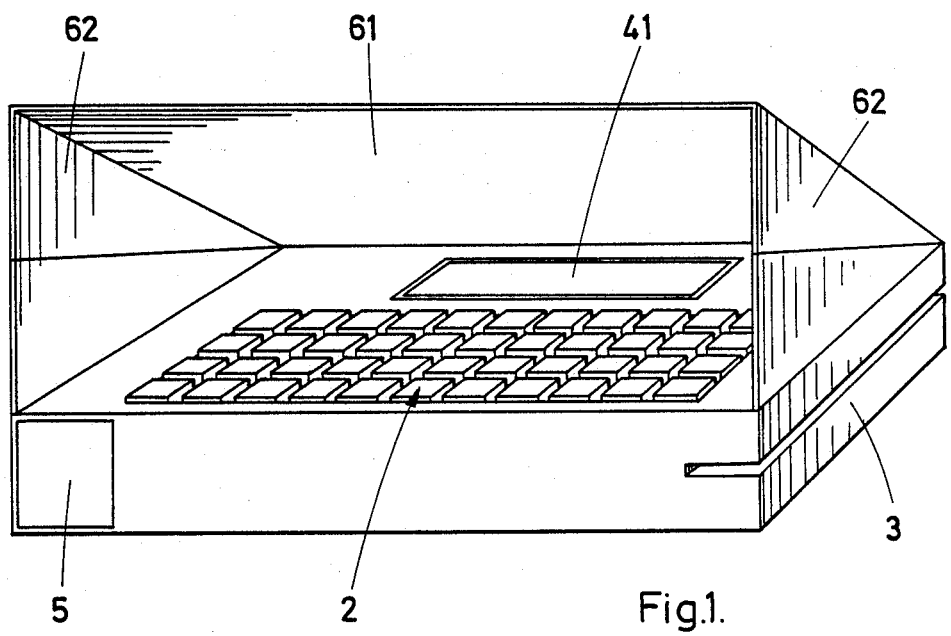
FIG. 1 is a perspective view of a portable apparatus according to the invention.
Figure 2:
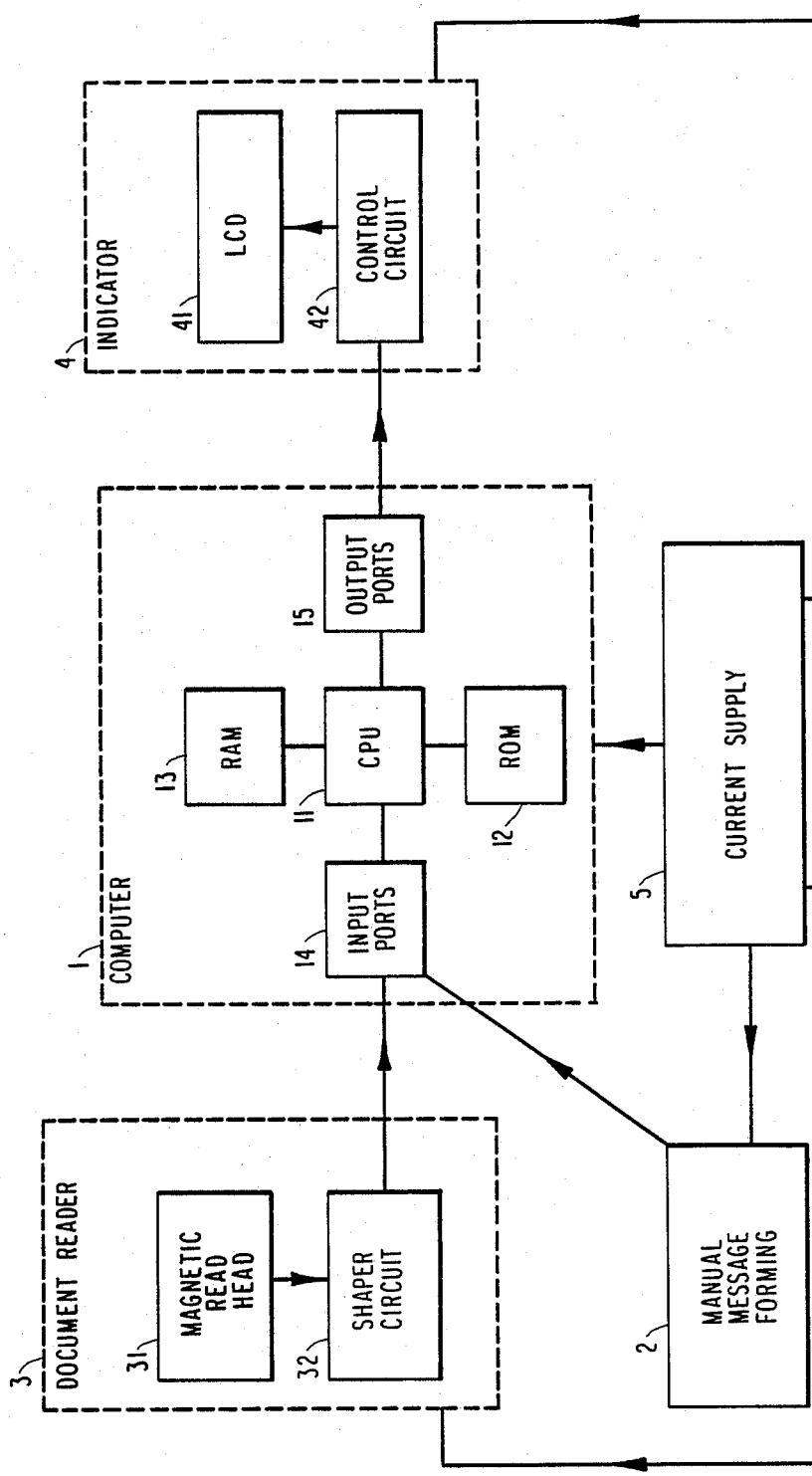
FIG. 2 is a block diagram of a first embodiment of the apparatus according to the invention.

For applications related to credit cards, this apparatus is portable and self-contained; it does comprise the following elements (see FIGS. 1 and 2):

a computer 1 which can be implemented by means of a single-chip microprocessor including a computing unit CPU 11, a read-only memory 12 the content of which may no more be changed, a random-access memory 13, input ports 14 and output ports 15;

means 2 allowing to form a message by hand, such as a keyboard including letters, digits, a few signs and control keys, and connected to input ports 14 from the microprocessor (1);

a document reader (3), such as a magnetic-card reader provided with a magnetic read head 31 and a shaper integrated circuit 32, and connected to input ports 14 from the microprocessor 1;

an indicator 4, such as a liquid-crystal display LCD including a screen 41 and a control integrated circuit 42, and connected to output ports 15 from the microprocessor 1;

a general current supply 5, such as dry cells;

an opaque screen protecting from indiscreet viewers, the means 2 and the screen 41 from indicator 4, formed by a main hood 61 and side panels 62.

The apparatus components may advantageously be molded from a transparent resin to make it very difficult to conceal any falsifying.

Said apparatus operates in the following way (see FIG. 3):

The holder of the credit card types on keyboard 2, the secret message which is transposed by the apparatus into a binary number M by means of a code such as the ASCII code (American Standard Code for Information Interchange).

For example, by means of the code "Even parity ASCII", the letter A is transposed into byte 01000001 and the digit 1 into byte 10110001. The characters may be received in byte form, by a digital memory.

The various bytes representing the message characters are arranged one behind the other; they thus form a large binary number, the number M.

As soon as the message is ended, the apparatus enciphers the binary number M, there is then obtained:

$$C = E_A(M) \text{ (comp. 1)}$$

When the apparatus makes use of the RSA cryptography method, it does determine the whole remainder from dividing $M^e$ (for example $M^3$) by number n, the divisor, contained in ROM 12 (see rel. 2).

When the computing is complete, the credit card 91 is entered in reader 3 and the apparatus forms a number which is a function of the result C from the preceding computation and of the binary number S as read on the card, for example by performing an addition in modulo 2 between the bits with the same place in both said numbers. This operation may be shown with $(C \oplus S)$; there is obtained:

$$K = (C \oplus S) \text{ (rel. 4) (comp. 2)}$$

By way of example for this kind of operation:
$$(1100 \oplus 1010) = 0110$$

Indeed:

$(1+1) \text{modulo } 2 = 0$ $(1+0) \text{modulo } 2\ 32\ 1$ $(0\ 30\ 1) \text{modulo } 2 = 1$ $(0+0) \text{modulo } 2 = 0$ With a,b,c representing any binary numbers, the following relations check out:

$(0 \oplus a) = (a \oplus 0) = a \text{(rel. 5)}$ $(a \oplus a) = 0 \qquad \text{(rel. 6)}$ $(a \oplus (b \oplus c)) = ((a \oplus b) c) \qquad \text{(rel. 7)}$ Finally, a card 90 from the same credit organization, which is in the hands of the person in charge of checking (the trader for example), is fed into the reader 3. The apparatus then receives a non-secret information relating to key B being used by said organization and enters such information into RAM 13.

With the RSA method, such information will be the binary number pertaining to key B (see rel. 2).

The apparatus then performs on the number K, an enciphering as described above, but by using the public key B', there is obtained the result T.

Ti $T = E_B(K) = E_B(K)$ (rel. 8) (comp. 3)

The apparatus finally checks the expected match between a non-secret reference number F contained in ROM 12, and the result T from the mathematical processing and displays in a favorable case, an information originating from T. For this purpose, the apparatus may for example cut the binary number T into a plurality of bit blocks $T_1, T_2, \ldots$ One said blocks should have the expected match with reference number $$F \equiv T \qquad \text{(comp. 4)}$$

Two other blocks represent a sequence of ASCII codes which are transposed into characters and displayed. Such displays should correspond with markings shown unscrambled on the credit-card, for example the card number and the issue year of the card. The trader may easily perform such checking.

In this way, the authenticity of such markings and the effectiveness of the link joining same to the secret message are checked.

Another information which is not present on the credit-card may also be displayed, then when same is reproduced on the debit-note made out by the trader for the credit organization, it does confirm that the apparatus has actually been used.

As regards the manufacturing of the credit-card 91, the number S to be put on the card is worked out in two steps (see FIG. 4):

The first step may be made in a recognized agency office.

Figure 5:
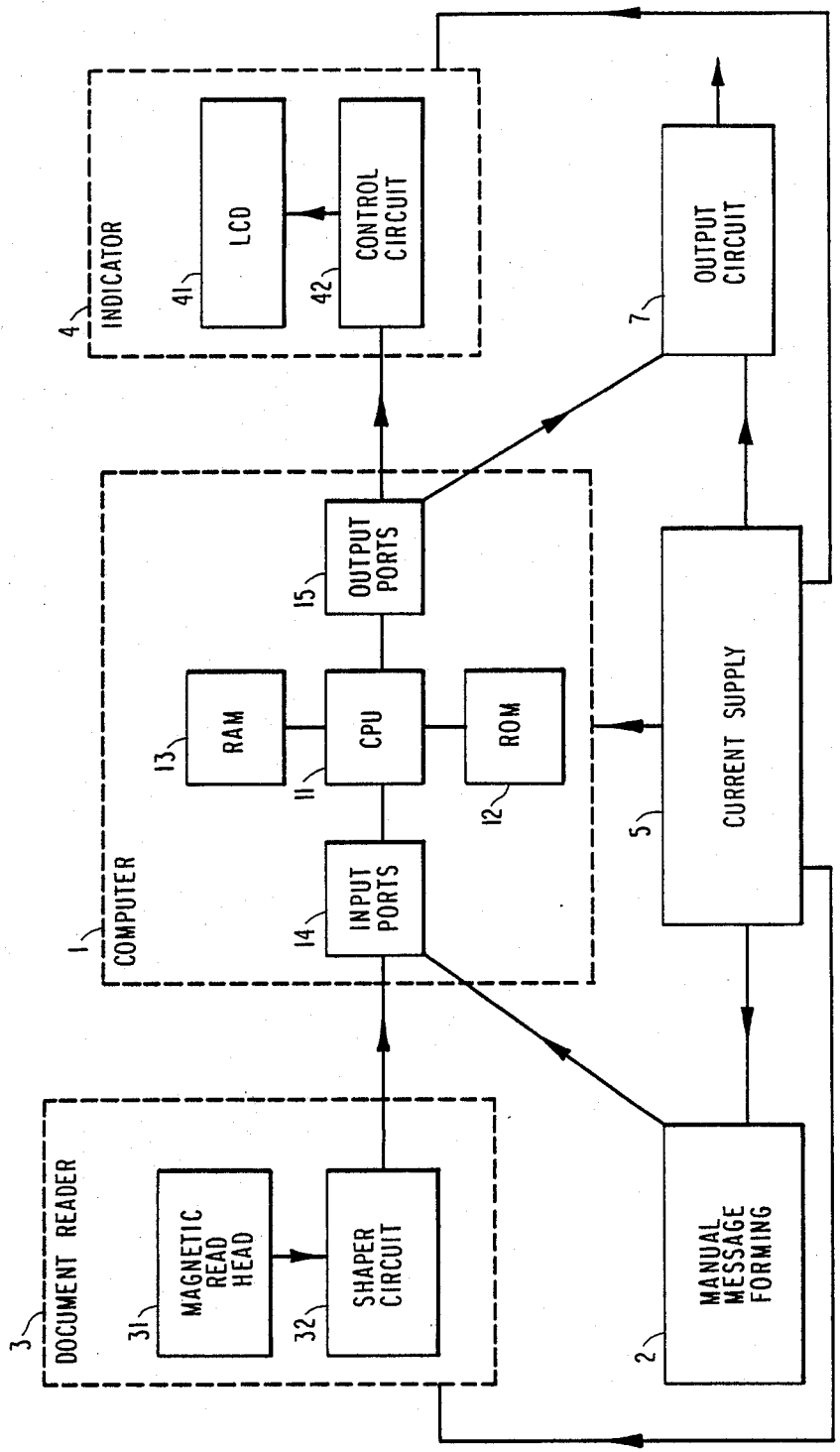
FIG. 5 shows a block diagram of a second embodiment of the apparatus according to the invention.

The future card holder types the secret message he has selected on the keyboard of an apparatus similar to the above-described one, but which is provided with an output circuit 7 connected to an output port from the microprocessor 1 (see FIG. 5).

The procedure being followed is the same as described hereinbefore, to the exception that there is no credit-card to be fed. Let U be the mathematical processing result:

$$C = E_A(M) \text{ (rel. 9)(comp. 5)}$$

$$U = E_B(C) \qquad \text{(rel. 10)(comp. 6)}$$

The apparatus provides through output circuit 7 the computation result U, without performing any checking, nor displaying which are without object in this case. The number being provided is for example printed and given to the credit organization together with the registration form.

During the second step, the credit organization computer enciphers two numbers by means of the secret key (B'') paired with the public key (B') which has been used for the second enciphering. Said two numbers are the number U and a number identical to that mathematical processing result T it is desired to obtain by the checking (see hereinabove). There is obtained:

$D_B(U) = C$ (comp. 7)

as $U = E_B(C)$ (see relations 10 and 1)
$D_B(T) = K$ (comp. 8)

as $T = E_B(K)$ (see relations 8 and 1).

The computer then finds out the number S to be put on the credit-card by computing the addition in modulo 2 of the bits in the same place in the results from both encipherings; there is obtained:
ti $(C \oplus K) = S$ (comp. 9)

Indeed as $K = (C \oplus S)$ (see relation 4)
$(C \oplus K) = (C \oplus (C \oplus S)) = S$ (see relations 7, 6 and 5).

It is to be noted that the secret key paired with the public key A' being used for the first enciphering of the secret message is not used at any time. Said key may thus be purposefully destroyed by the organism which develops the apparatus. Consequently, no third party relative to the credit-card applicant will be able to recover the secret message. The holder is thus the only person accountable for keeping the secret safe.

Moreover, the secret key B'' peculiar to a credit organization is only used by the organization computer and not by the apparatus checking the authenticity of the credit-card and the holder identity. Thus this credit organization is the sole owner of said secret key and the only one accountable for a possible fraudulent use thereof (manufacturing false cards).

The document, credit-card, bank-card, check, access badge, etc... the authenticity of which is to be checked, should include an information which represents the number S and which is read by the apparatus according to the invention; for this purpose, it is provided with a magnetic tape, an optic track, etc..., for example.

Thus the invention pertains more particularly to a check provided with a magnetic deposit in the shape of a strip, or with a location reserved for a bar code marking including data which allow to check the authenticity of said check as well as the holder identity, by working with the method and/or the apparatus as described hereinabove.

Other models of the apparatus allowing to check credit-cards may be designed:

A simplified mathematical processing which does not include the first enciphering for M may be adopted. There is then obtained:
Ti $T = E_B(M \oplus S)$ However in such a case the credit organization can recover the secret message by using that secret key which is required to develop the credit-card.

The mathematical processing may comprise on the one hand, enciphering M by means of that public key A' contained in ROM 12, and on the other hand enciphering number S by means of that public key B' stored in RAM 13. The mathematical processing result is a number which is a function of the enciphering results obtained for example by performing a modulo-2 addition between the bits in the same place in the enciphering results. There is obtained:

Ti $T = (E_A(M) \oplus E_B(S))$.

In all the mathematical processings as considered hereinabove, encipherings may be added.

In every case, the procedure for working the number S out has to be adapted.

Figure 6:
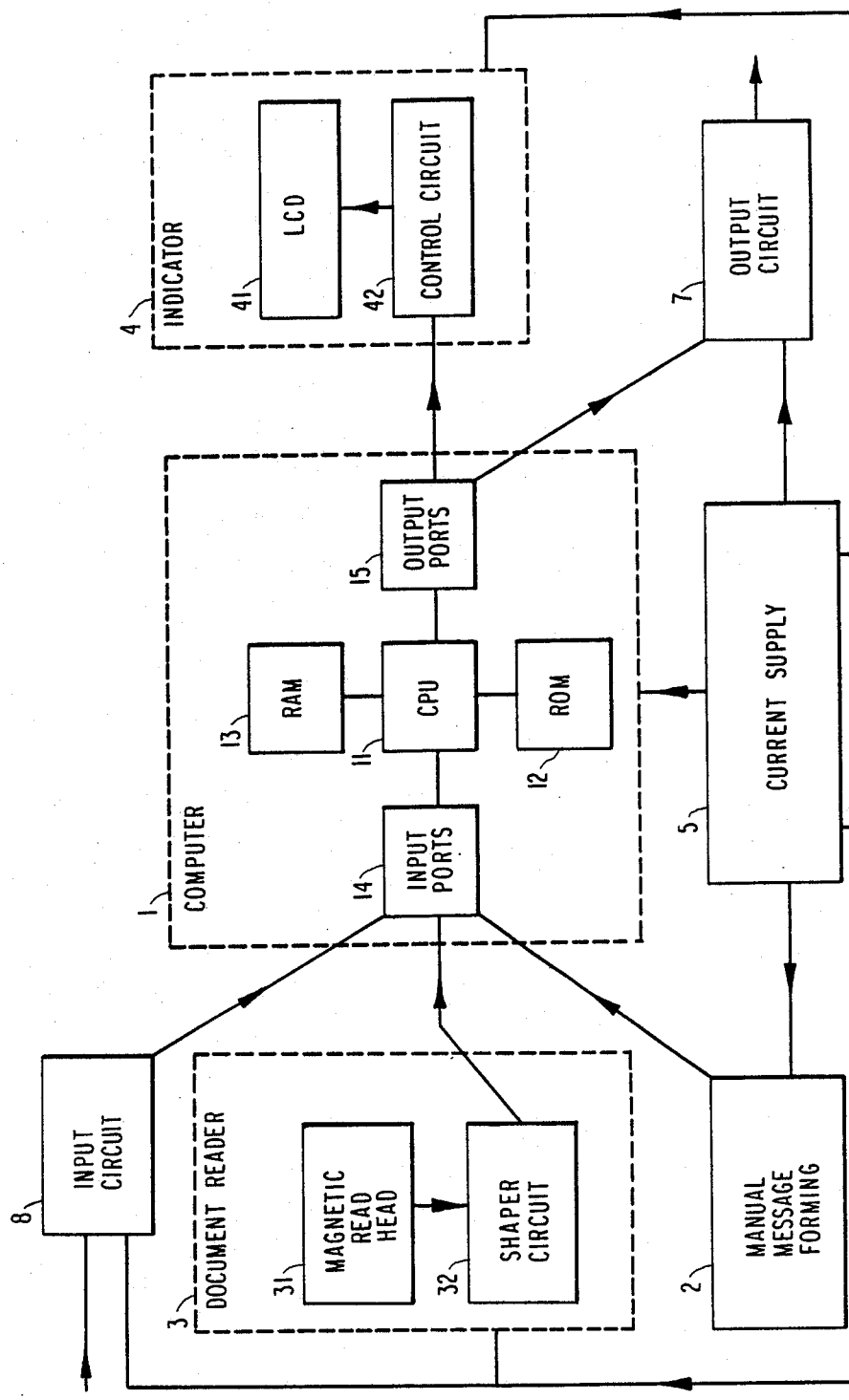
FIG. 6 shows a similar block diagram of a third embodiment of the apparatus according to the invention.

For uses pertaining to automatic payments, to cash withdrawals, and to access control, the apparatus working the method is part of a fixed equipment; it does comprise the same elements as the apparatus checking the credit-cards, but provided moreover with an output circuit 7 and possibly with an input circuit 8 (see FIG. 6). The current supply 5 is normally obtained from the mains. On the other hand, that public key B' required for the second enciphering may be included in the apparatus, be read previously by reader 3 from a card in the hands of the equipment-responsible person, or be coupled to the apparatus through link 8. In both latter cases, the key may easily be renewed every year, for example.

The operation is very similar to the apparatus for checking credit-cards (see FIG. 3):

Typing the secret message and transposing same into a number M

Enciphering M by means of public key A': there is obtained the number C

Reading the number S on the bank-card or the access badge and computing $(C \oplus S)$: there is obtained K Enciphering the number K by means of public key B': there is obtained T Checking the expected match between reference number f and the one block from binary number T Coupling through link 7, to the remaining part of the equipment (cash distributing machine, opening mechanism, etc...), the checking result and blocks from T representing the identification data for the card and the holder thereof.

As for checking credit-cards, various variations in the method are possible.

For communication purposes where a network user has to make himself known positively to the central station which comprises the other party, the apparatus comprises the same components as in the preceding case (see FIG. 6), the links 7 and 8 being connected to the communication network.

As soon as the connection has been made, the following procedure is followed (see FIG. 7):

Typing the secret message and transposing same into a number M

Enciphering M by means of public key A': there is obtained number C

Reading the number S on the user card and computing $(C \oplus S)$: there is obtained K Receiving a number R sent by the other party. Said number may be selected randomly or define the connection moment (date, hour, etc . . . )

Computing $(K \oplus R)$

Enciphering $(K \oplus R)$ by means of public key B'. There is thus obtained the number V:

$V = E_B(K \oplus R)$

Sending the number V to the other party.

Checking the user card authenticity and the holder identity is made by the other party from the numbers R and V by means of the public key B' and secret key B'', in the following way:

$E_B(D_B(V) \oplus R)$ 32 $E_B((K \oplus R) = E_B(K) = T$.

As in the previous case, the one bit block from T has to have the expected match with the reference number F; two other blocks give data for identifying the card and the holder thereof.

As communication networks are not secure from indiscretions, it is to be noted that for each call, the number V is different because R is; a fraudulent re-use of V is thus excluded.

For automatic payment applications, for "Home banking", etc . . . , when the user wants to send to the other party, a secret, signed information L said other party alone should have cognition of and have proof of the origin thereof (the signature), the user sends to the other party a second number W:

$W = E_B(K \oplus R \oplus L)$

The other party can reconstruct L from the enciphering results for V and W by means of secret key B'':

$(D_B(V) \oplus D_B(W)) = ((K \oplus R) \oplus (K \oplus R \oplus L)) = L$.

In the previous art, a secret, signed message had necessarily to be enciphered by means of a secret key, while in the described method, use is only made of public keys to encipher the message L.

The information L may in case of need, be a cryptography key developed by the user, which allows exchanging messages between the user and the other party.

As for checking credit-cards, various variations in the method are possible.

In the above-defined equations, E is an enciphering neither the algorithm, nor the key thereof have to be kept secret, while D is the reciprocal enciphering performed by means of the paired secret key.

It must be understood that the invention is not limited to the above-described embodiments of the method and the apparatus according to the invention.

For instance, public-key cryptography systems other than the RSA system might be used and the apparatus could be modified and adapted according to the specific application being considered.

With the word "enciphering" as used in this description, there should be understood any computation type which fulfills the rules of public-key cryptography and which comprises one or a plurality of similar or different algorithms.

We claim:

1. Method for checking the authenticity of a document, such as credit-card, bank-card, check, access badge, etc., as well as the identity of the holder thereof by data processing, wherein said document is provided with data including a secret message for confirming the document holder identity to control the match between said document holder identity to control the match between said document and message, which comprises:
   providing said document with a specific characteristic which does not necessarily have to be kept secret but which defines a hidden relation notably with said message;
   feeding the data pertaining to the message and document characteristic to a computer;
   performing with said computer, from said data and possibly also from another remotely-conveyed, non-secret information, a first enciphering according to a first public-key cryptography method using only a first public key to produce first enciphered information;
   performing a second enciphering according to a second public-key cryptography method using only a second public key to produce a second enciphered information; and
   checking with the computer, by a third party and/or remotely with another computer, whether a match exists between said second enciphered information and at least one non-secret reference number, independent from the document, wherein the authenticity checking method involves only public-key encryption of said secret message.

2. Method as defined in claim 1, wherein said secret message is formed by a sequence of signs, such as letters, digits, spaces, symbols, etc . . . .

3. Method as defined in claim 1, wherein said secret message is independent from the document characteristic data lying in unscrambled form on the document, and wherein said secret message may be selected by a future document user.

4. Method as defined in claim 1, wherein said first and second public-key cryptography methods employ the R.S.A. (Rivest, Shamir & Adleman) system, with the following algorithm:
   $M^e$ modulo $n = C$, wherein M is that integer which is the object of enciphering or a number which is a function thereof, e and n are integers forming the public key and C is the whole remainder from dividing $M^e$ by n, and having the enciphering result be either the result of such computing, a function thereof, or a function of the result from a plurality of computations performed in sequence according to a similar or different algorithm, the result from one computation or a function thereof being the object of the following computation.

5. Method as defined in claim 4, in which the exponent being used in one or a plurality oof encipherings is the number 3.

6. Method as defined in claim 4, in which the divisor n, being used for the enciphering or one of the encipherings, is comprised of but two very large prime factors which are each preferably larger than the 200th power of 2.

7. Method as defined in claim 1, wherein said second enciphering step comprises the step of enciphering a number which is a function of the result of the first enciphering and the specific characteristic provided on the document, previously transposed in digital form.

8. Method as defined in claim 7, which further comprise providing an indicator, such as a LCD display, a printer, etc . . . , allowing a third party to check the expected match with one or a plurality of markings clearly readable on said document.

9. Method as defined in claim 7, which further comprises conveying by a link, such as an electric, optic or similar link, a signal which shows the checking result and possibly identification data originating from the mathematical processing result.

10. Method as defined in claim 1, wherein said second enciphering step comprises the step of enciphering a number which is a function of the secret message and the specific characteristic provided on the document, each previously transposed in digital form.

11. Method as defined in claim 1, wherein the second enciphering step comprises the step of enciphering the document characteristic data, said method further comprising forming a number which is a function of the first and second enciphering results, and considering the match between said number and said reference number.

12. Method as defined in claim 1, wherein said second enciphering step comprises enciphering a number which is a function of the first enciphering information, of the specific characteristic provided on the document, previously transposed in digital form, and of authentication information conveyed by the corresponding party who has to remotely check the document authenticity and the holder identity, said method further comprising the steps of conveying to said corresponding party said second enciphered information and having said corresponding party perform suitable computations, and then perform said checks by considering the match between the result from said latter computations and said reference number, and by controlling from said result, the document identification data resulting therefrom.

13. Method as defined in claim 12, wherein said authentication information comprises random information such that only a holder of a suitable secret key might have cognition thereof and be assured of the information origin.

14. Method as defined in claim 1, wherein said second enciphering step comprises enciphering a number which is a function of the first enciphering information, of the specific characteristic provided on the document, also previously transposed in digital form, and of authentication information conveyed by the corresponding party who has to remotely check the document authenticity and the holder identity, sending to said corresponding party the mathematical processing result, and having said corresponding party, after making the suitable computations, perform said checks by considering the match between the result from said latter computations and said reference number, and by controlling from said result, the document identification data resulting therefrom.

15. Method as defined in claim 14, wherein said authentication information comprises random information, such that only a holder of a suitable secret key might have cognition thereof and be assured of the information origin.

16. Apparatus for checking the authenticity of an individual-linked document, notably credit-card, bankcard, check, access badge, etc. as well as the document-holder identity, comprising a reader for reading at least one characteristic of said document means for forming a secret message confirming said identity, a computer provided with computing and memory functions, connected to said reader and said means for forming the message, for performing from those data obtained by the reader and said forming means, and possibly from other remotely-conveyed data, a mathematical processing including a first enciphering according to a first public-key cryptography method using only a public key to produce first enciphered information, means for checking with said computer, by a third party, and/or remotely with another computer, whether a match exists between said collected data, a non-secret number independent from the document, and identification data present in unscrambled form on the document, which match is disclosed by the mathematical processing, wherein said identification data present in unscrambled form on the document comprises said secret message which has been enciphered using a secret key which corresponds to said first public key, but wherein said checking means comprises means for ascertaining existence of said match using only said first public key.

17. Apparatus as defined in claim 16, wherein the computer comprises a computing unit, a memory the content of which is unchangeable, a random-access memory wherein data can be inputted, and input and output ports, wherein the reader is provided with a magnetic or optic read head and possibly with a shaper circuit, and is connected at least to one input port of said computer, and wherein said apparatus further comprises an indicator such as a liquid-crystal display and an output computer port to which the indicator is connected possibly through a control circuit.

18. Apparatus as defined in claim 16, in which at least that circuit connecting the means for forming the message to the computer, is visibly mounted to allow continuously inspecting said circuit.

19. Apparatus as defined in claim 18, in which said circuit is embedded in a transparent resin.

* * * * *